US006480210B1

(12) United States Patent
Martino et al.

(10) Patent No.: US 6,480,210 B1
(45) Date of Patent: Nov. 12, 2002

(54) VIDEO BROWSING SPACE

(75) Inventors: Jacquelyn A. Martino, Cold Spring, NY (US); Lira Nikolovska, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/343,911

(22) Filed: Jun. 30, 1999

(51) Int. Cl.[7] ................................................ G09G 5/00
(52) U.S. Cl. ...................................... 345/848; 345/764
(58) Field of Search ............................ 345/848, 968, 345/853, 854, 850, 849, 841

(56) References Cited

U.S. PATENT DOCUMENTS

| | | | |
|---|---|---|---|
| 5,303,388 A | | 4/1994 | Kreitman et al. ........... 395/159 |
| 5,528,735 A | * | 6/1996 | Strasnick et al. ........... 345/427 |
| 5,745,109 A | * | 4/1998 | Nakano et al. ............. 345/781 |
| 5,835,094 A | * | 11/1998 | Ermel et al. ................ 345/848 |
| 5,884,282 A | * | 3/1999 | Robinson ..................... 705/27 |
| 6,188,405 B1 | * | 2/2001 | Czerwinski et al. ........ 345/764 |
| 6,219,045 B1 | * | 4/2001 | Leahy et al. ................ 345/751 |
| 6,222,557 B1 | * | 4/2001 | Pulley, IV et al. .......... 345/433 |
| 6,281,898 B1 | | 8/2001 | Nikolovska et al. ........ 345/848 |

FOREIGN PATENT DOCUMENTS

WO     WO9901984     1/1999 .......... H04N/7/173

OTHER PUBLICATIONS

Muriel Cooper, "Visible Wisdom", MIT Media Lab, I.D. Sep./Oct. 1994, pp. 49–97.

* cited by examiner

Primary Examiner—Raymond J. Bayerl
Assistant Examiner—Tadesse Hailu
(74) Attorney, Agent, or Firm—Edward W. Goodman

(57) ABSTRACT

A user interface for accessing a database, organized into an information landscape, uses an architectural metaphor, namely, a stadium, to organize the information of the database for greater user accessibility. Spotlight and query tools are used to help the user access items within the database. A multi-user version includes a chat space feature.

22 Claims, 11 Drawing Sheets

VIDEO BROWSING SPACE

BACKGROUND OF THE INVENTION

1. Field of the Invention

The invention relates to user interfaces for accessing database information in a data processing system, and in particular, to interfaces providing an illusion of a three dimensional information space for presenting the database information.

2. Description of the Related Art

Organization of databases traditionally is in the form of data structures of text. This text is then keyword searchable. Such databases are fairly ineffectual in that the user has little concept of what is in the database or how best to find it.

Muriel Cooper at MIT has done seminal work in the area of information spaces, providing a more visually accessibly order for data, as shown in the video tape: "Information Landscapes", Jul. 20, 1994 FINAL VERSION, from the MIT Center for Advanced Educational Services. This work shows information arranged in apparent three dimensional spaces. The organization is visible to the user and, therefore, assists in search. The user has the illusion of flying through the space, while viewing it.

One problem with the use of information spaces is that users can get lost, not remembering how to return to places they have already visited, and not knowing how to find new categories of information.

U.S. Pat. No. 6,281,898 proposes a technique for making information spaces more easily accessible, namely, use of constantly viewable axes and walls to give the user a frame of reference while traveling through the space.

However, information spaces still have room for improvement.

SUMMARY OF THE INVENTION

The object of the invention is to further assist the user, by better organizing the information space.

In one aspect, the invention makes use of an architectural metaphor, the stadium, for organizing information into a structure that the user is likely to find familiar, and therefore more accessible. Thus the information is organized into tiers. Each tier represents an information category. A first tier is at a respective first apparent level. A second tier is at a respective second apparent level. The second tier is apparently adjacent to the first tier in a first apparent dimension, but with offsets relative to the first tier in second and third apparent dimensions.

In another aspect, the invention includes a query tool and a spotlight tool for shining an apparent spotlight on at least one appropriate section of an information space in response to the query tool.

In yet another aspect, the invention includes a navigation tool for specifying motion within the information space. The navigation tool comprises a navigation portion for specifying motion within the space. The navigation tool also comprises a heuristic criterion portion for specifying a heuristic criterion for selecting data items.

In still a further aspect, the invention includes the ability to select a video selection from an information landscape. Responsive to a selecting means, the interface displays a video information selection display including a preview screen.

BRIEF DESCRIPTION OF THE DRAWINGS

The invention will now be described by way of non-limitative example with reference to the accompanying drawings, in which.

DESCRIPTION OF THE PREFERRED EMBODIMENTS

Figure 1:
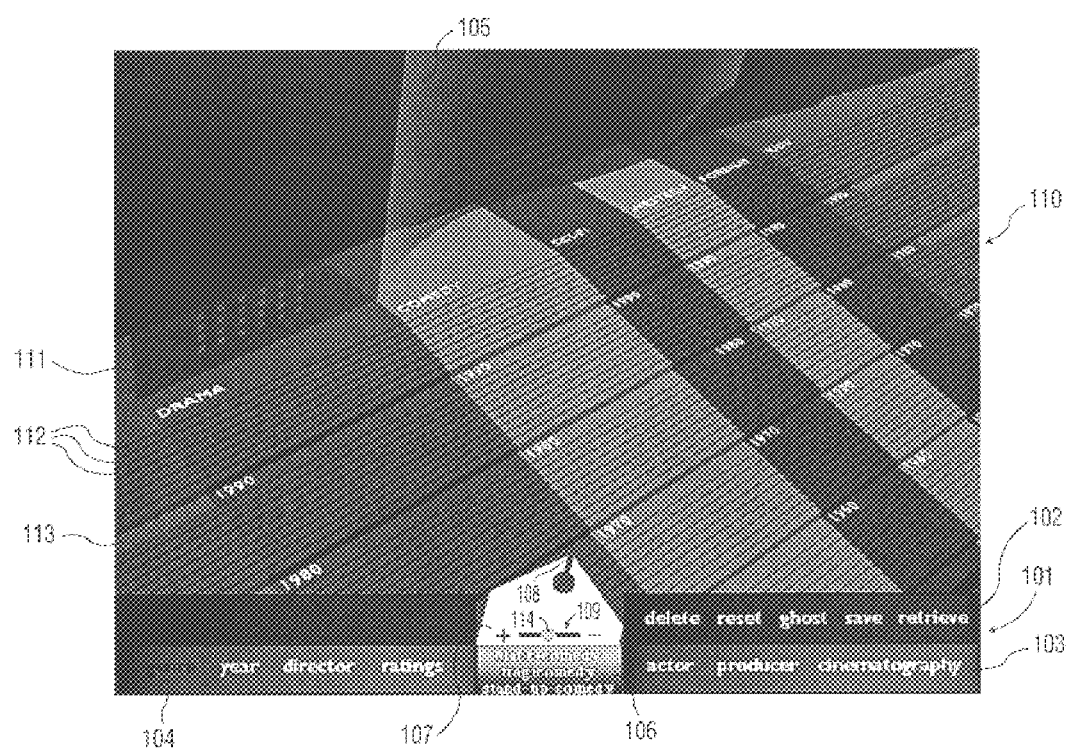
FIG. 1 illustrates the user interface of the invention.
Figure 1A:
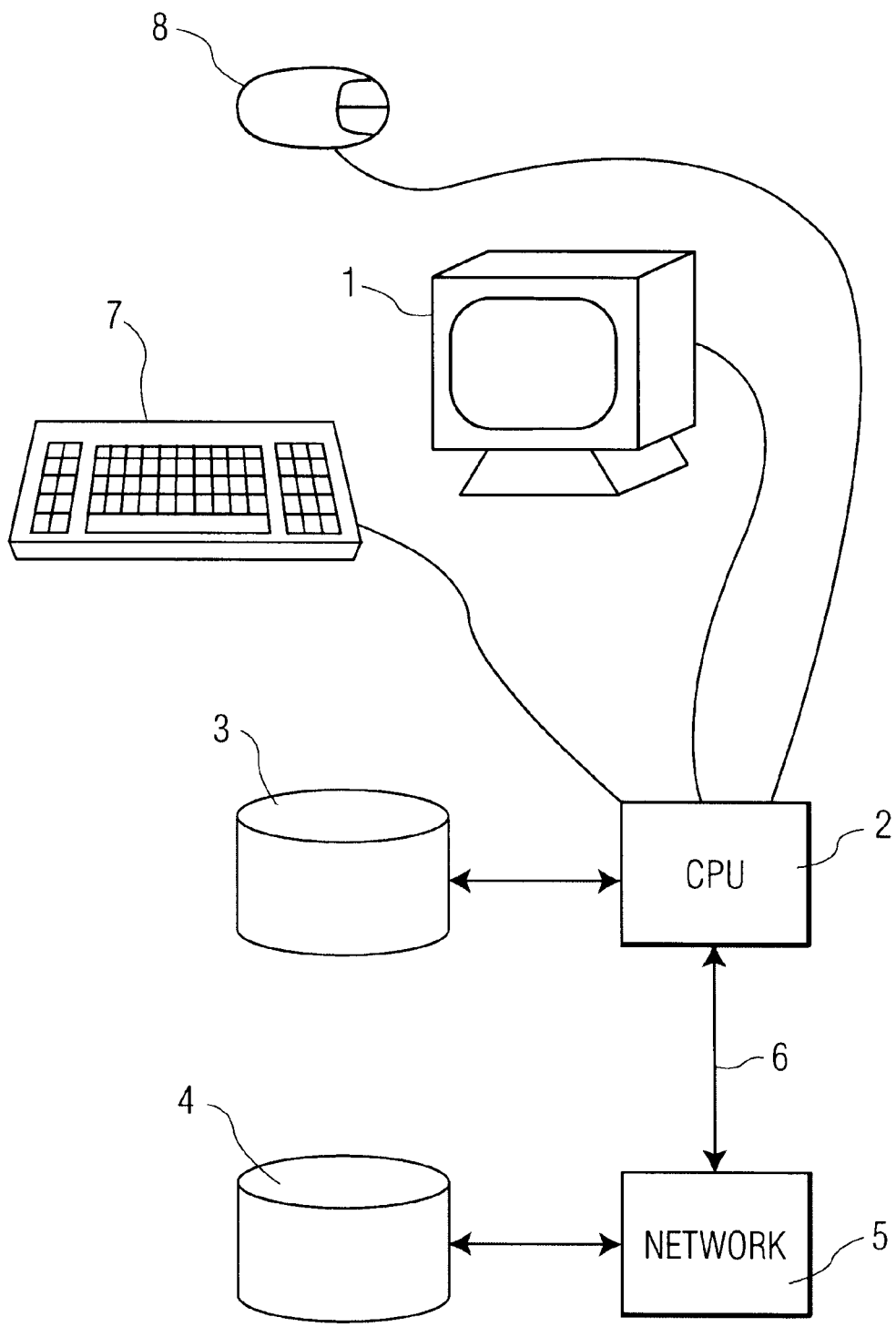
FIG. 1A is a schematic of a system in which the interface of the invention can be used.

FIG. 1A shows a system which includes the user interface of the invention. The system has a display device 1, which may be a television or a monitor having a CRT, a liquid crystal device, or any other suitable display mechanism. The display device 1 is connected to a processor 2, which may be a PC, a set-top box, or any other suitable data processing device. The processor 2 might also be rather limited, making the display device a "dumb" monitor. The processor 2 may have a local memory device 3. Typically, the processor 2 has user input devices, such as, a keyboard 7 and a point/select device 8. The point/select device 8 may be a mouse, track ball, incorporated into the keyboard 7, a touch sensitive screen, or any other suitable point/select mechanism. The memory device 3 may be a hard drive, a CD-ROM drive, a floppy drive, a ZIP drive, or any other suitable memory device. The processor 2 and/or display device 1 may be connected via connection 6 to a network 5 equipped with its own memory 4. The network 5 may be of any type, such as, a local area network (LAN), a larger private network, or the Internet. The illustrated connections of FIG. 1A may be wired or wireless. The database to be accessed may be resident on the memory 3, the memory 4, or any other memory accessible through the network 5. Software for generating the user interface may be stored on the memory device 3, hard-wired into the processor 2 or transmitted from the network 5.

FIG. 1 illustrates a database interface in accordance with the invention. The interface is shown with respect to a database of movies. However, the interface might alternatively be applicable to a database of other information.

The database is illustrated in the form of an information landscape 110, illustrated in perspective. The landscape is organized according to the architectural metaphor of a stadium. A table, where the columns 111 are film genres and the rows 112 are years listed under decade headings 113, is distributed over the stadium.

Each row is at a different apparent level, like a tier of seating, with adjacent rows typically having an apparent vertical and an apparent horizontal offset from each other, when illustrated in perspective. Not all rows need have an apparent vertical offset with respect to the adjacent row, but at least some should. Database items are arranged chronologically by release date within each year. One of ordinary skill in the art might choose other types of categories of information, other than date, to assign to the rows. For instance, personnel information might be organized under location headings with rows organized by pay grade.

The genres of the preferred embodiment include drama, comedy, sci-fi, western, foreign, and kids in this example. However, other categories might be chosen. For instance, narrower categories, like "Alfred Hitchcock films" might be given their own section. The user might also be given the option to specify what categories to put over the section headings. In the current embodiment, each seating section in the apparent stadium corresponds to the films for a given decade within a given genre.

The visible portion 110 of the apparent stadium may have straight rows. However, the rows are preferably curved, to form an amphitheater. In this way, if the user zooms out high over the stadium, the stadium will not have a disturbing, infinite appearance which could intimidate the user. If all the data will not fit on the screen, a portion could be implied off the edge of the screen, as shown on either side of FIG. 1. Additional sections of the amphitheater may be added by increasing an apparent radius of curvature of the amphitheater.

The interface includes a tool area 101 at the bottom of the display. The tool area 101 includes a number of command options 102, such as delete, reset, ghost, save, and retrieve. The tool area 101 also contains a number of query category options 103, such as, genre, year, director, ratings, actor, producer, and cinematography. It is envisioned that not all options would necessarily fit in the display area. Additional options could be scrolled to along the tool bars in areas not visible on the display as shown.

Figure 2:
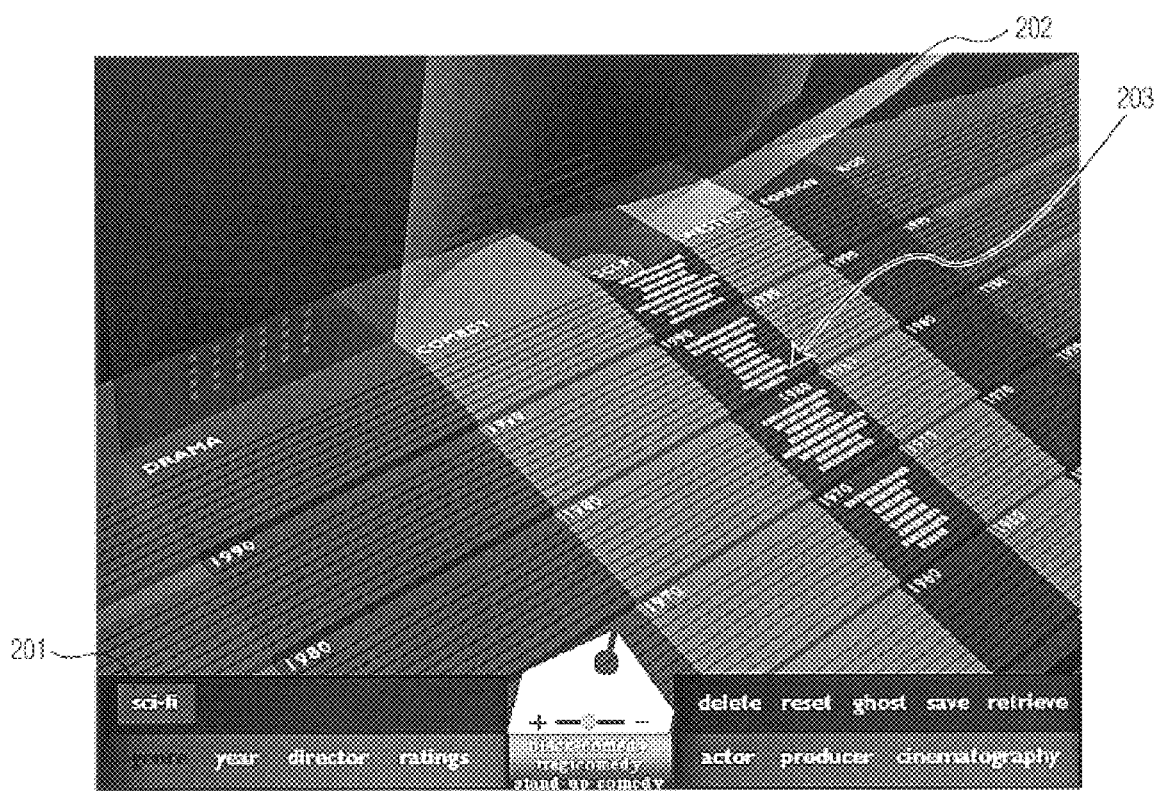
FIG. 2 shows a second step of a query using the user interface of the invention.

In this example, the query category "genre" 104 is highlighted in black, indicating that the user wishes to initiate a query based on genre, i.e., type of film. Simultaneously, the paper towel roll like tool at 106 displays genres that the user can select. The user can select from additional genres by requesting the tool 106 to rotate to show additional options. In response to selection of a genre, the interface causes that genre to appear in the area 201, as shown in FIG. 2.

Also included is a navigation tool 107. The pointed end 108 of the navigation tool 107 points in the direction of travel through the information landscape. The tool 107 is ouija-like in that the user can point it to initiate travel, or it can lead the user. The navigation tool 107 includes a spectrum 109, against which the user can specify more or less of a heuristic criterion. For instance, if the heuristic criterion is a rating by a particular critic, the user might only want films above a certain rating, in which case, the user would move the circle 114 toward the plus sign. Alternatively, the user might tell the interface to invert the criterion, and only yield schlock films with ratings below the indicated level.

Alternatively, the spectrum might be used for a zoom feature. Yet another alternative would be to have a characteristic motion of or click pattern on the pointed end indicate the zoom.

Figure 7:
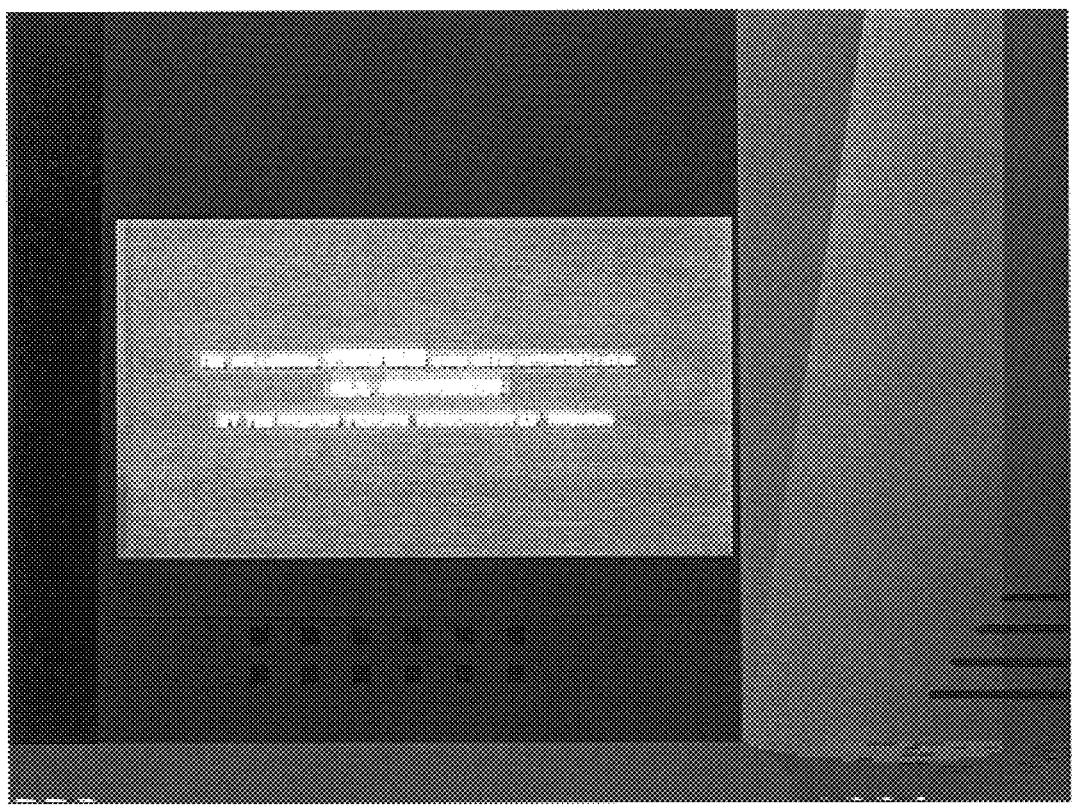
FIG. 7 shows a film preview.

Area 105 is reserved for previews. FIG. 7 shows a zoom-in on the preview area while a preview is showing.

FIG. 2 shows a second step in query formation in the user interface of FIG. 1. At this point, the user has entered "sci-fi" into the query tool area 201. Responsive to this entry, the interface "shines" a spotlight tool 202 onto the "sci-fi" section of the stadium. Additionally, all database items within the sci-fi section are highlighted in white 203. In some years, there were more science fiction releases meeting the heuristic criterion than in others. Accordingly, some years have more white squares than other years.

Figure 3:
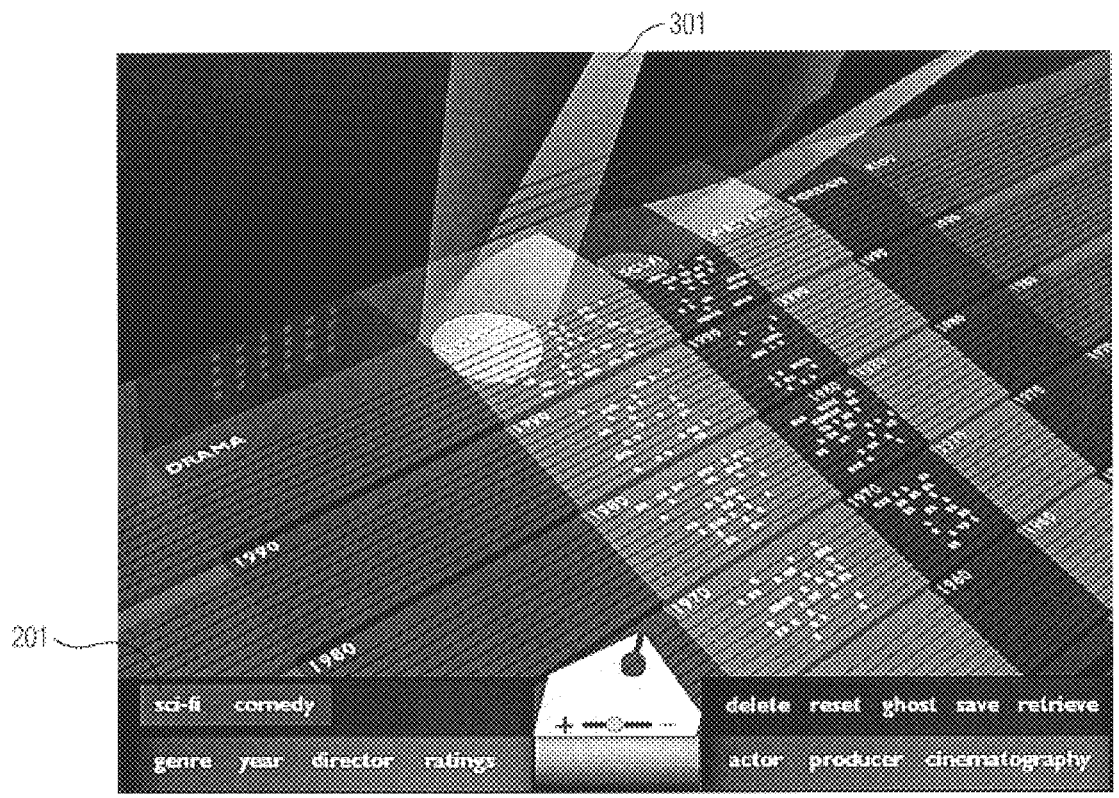
FIG. 3 shows a third step of a query using the user interface of the invention.

FIG. 3 shows a third step in the query process. The user has entered a second query keyword in the tool area 201. The second keyword is comedy. As a result, a second spotlight tool 301 is directed to the stadium section for comedy. Now, the items shown as highlighted under both comedy and sci-fi are those films having both comedy and sci-fi content. The interface is thus illustrated as assuming that the Boolean operation "AND" is to be applied to keywords entered into the tool section 201. However, one of ordinary skill in the art might equally apply other Boolean connectors, such as "OR", or allow for their specification.

Figure 4:
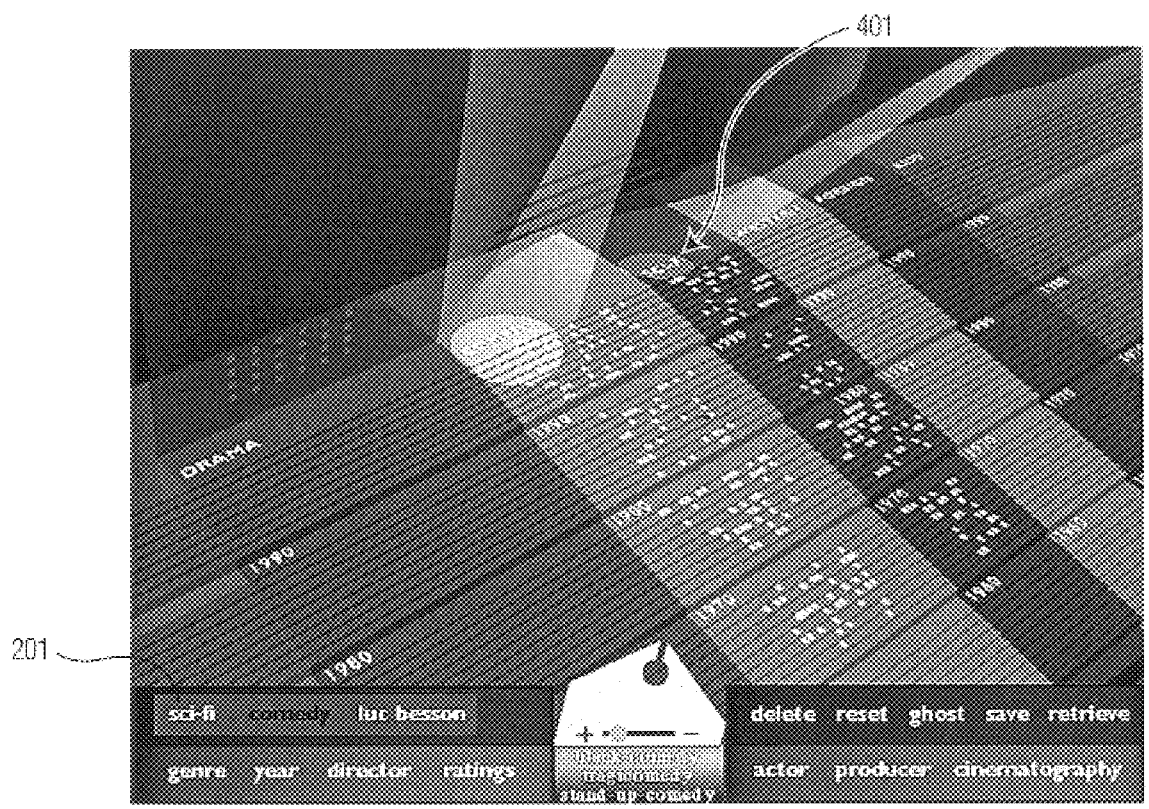
FIG. 4 shows a fourth step of a query using the user interface of the invention.

FIG. 4 shows a fourth step in a query operation. The user has now specified a third search term, the name of director "Luc Besson". The term "Luc Besson" is treated as a single search term, because of the spacing between it and the earlier term, though the interface might equally well treat it as a two terms. Accordingly, the films which are all of science fiction, comedy, and connected with Luc Besson are now highlighted. Those films which are only associated with the first two query terms are still highlighted in white, while those associated with all the query terms are high-lighted in red, e.g. at 401. The "ghost" command can be used by the user to toggle the white, secondary results in or out of the display, to cause the red items to stand out better.

A number of colors are described above, but these colors are optional. Those of ordinary skill in the art could devise other colors for use either as background or for highlighting. Also, while color is preferred, a grayscale version would be within the level of skill in the art.

Figure 4A:
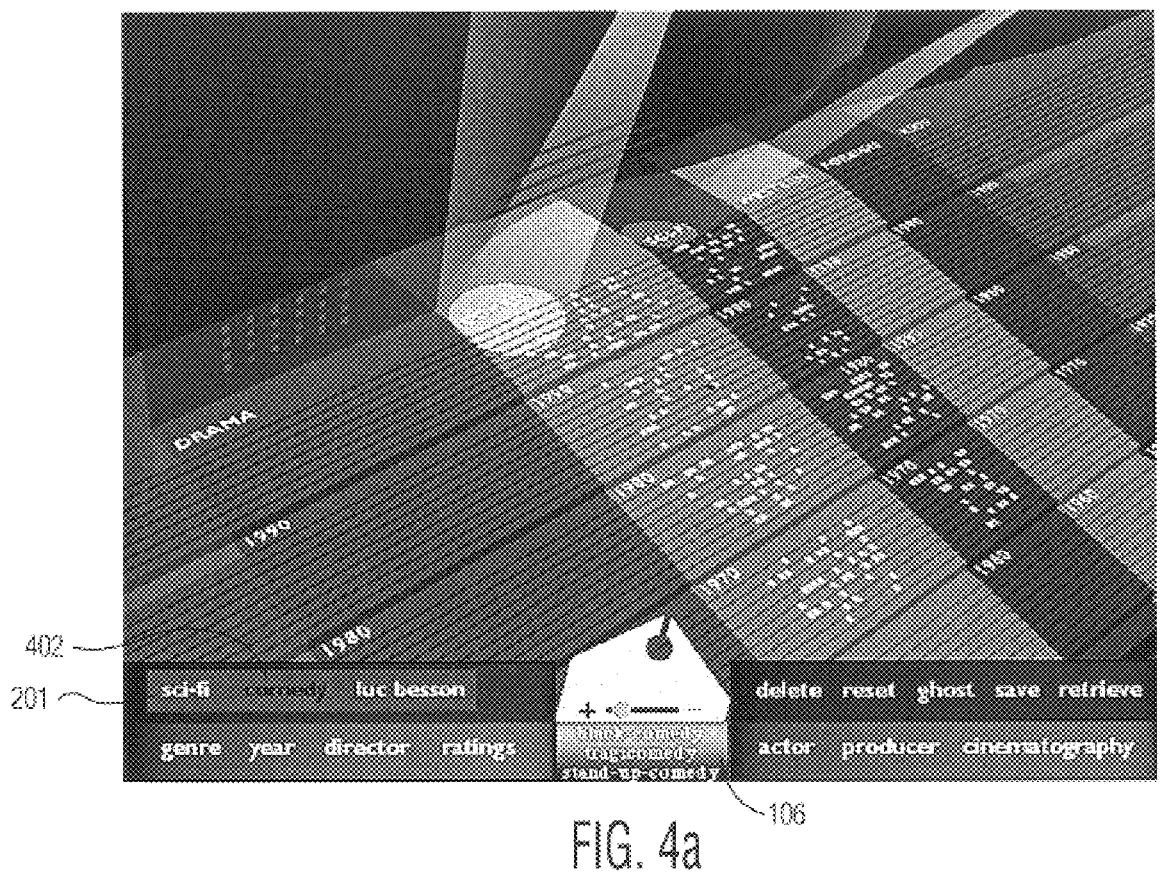
FIG. 4a shows a fifth step of a query using the user interface of the invention.

FIG. 4a shows a possible fifth step in the query operation. In this case, the user has highlighted the term comedy 402 in black within the query area. In response, subcategories of comedy are presented for selection on the paper towel roll like tool 106. Such additional query items should preferably be added to the right side of the tool 201. If so many query items are selected that they do not fit within the tool 201, they can be accessed by scrolling.

Figure 5:
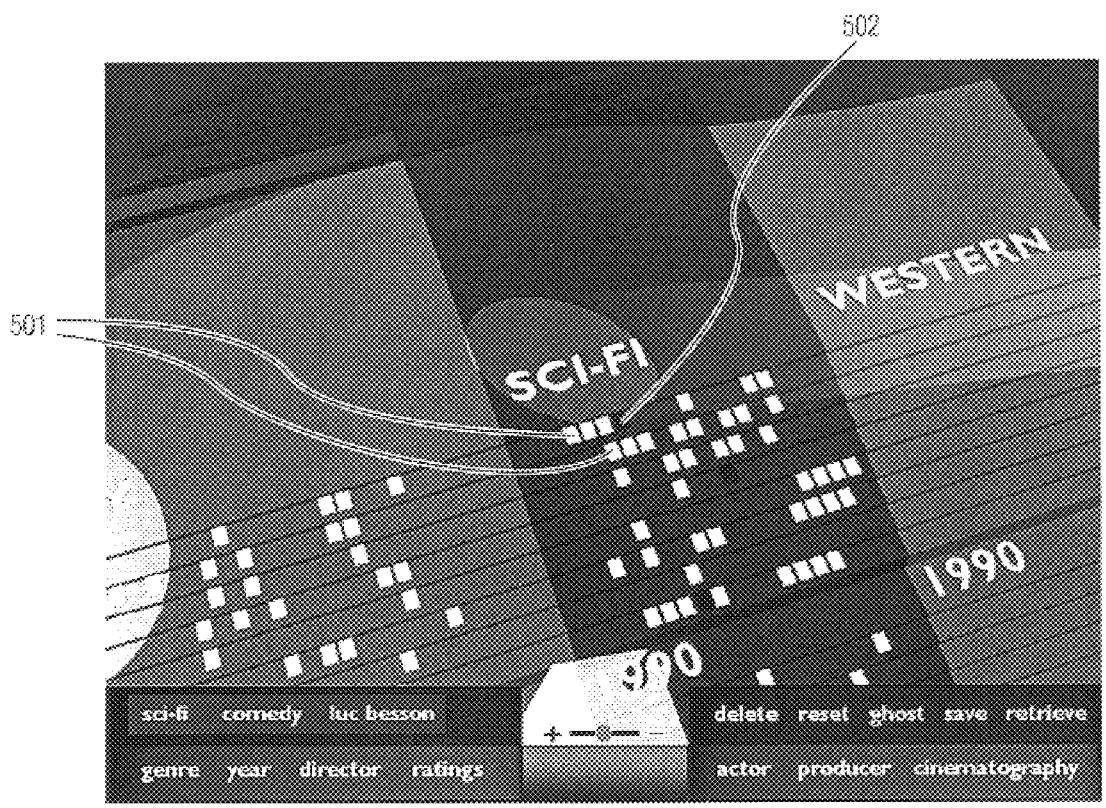
FIG. 5 shows a zoom feature.

FIG. 5 shows a zoom feature of the interface. In this case, the interface has zoomed in on science fiction films made after 1990, i.e., those highest up in the stadium. Again, those which are both comedy and science fiction are high-lighted in white, e.g., at 501, while those which satisfy all search criteria are high-lighted in red, e.g., at 502.

Figure 6:
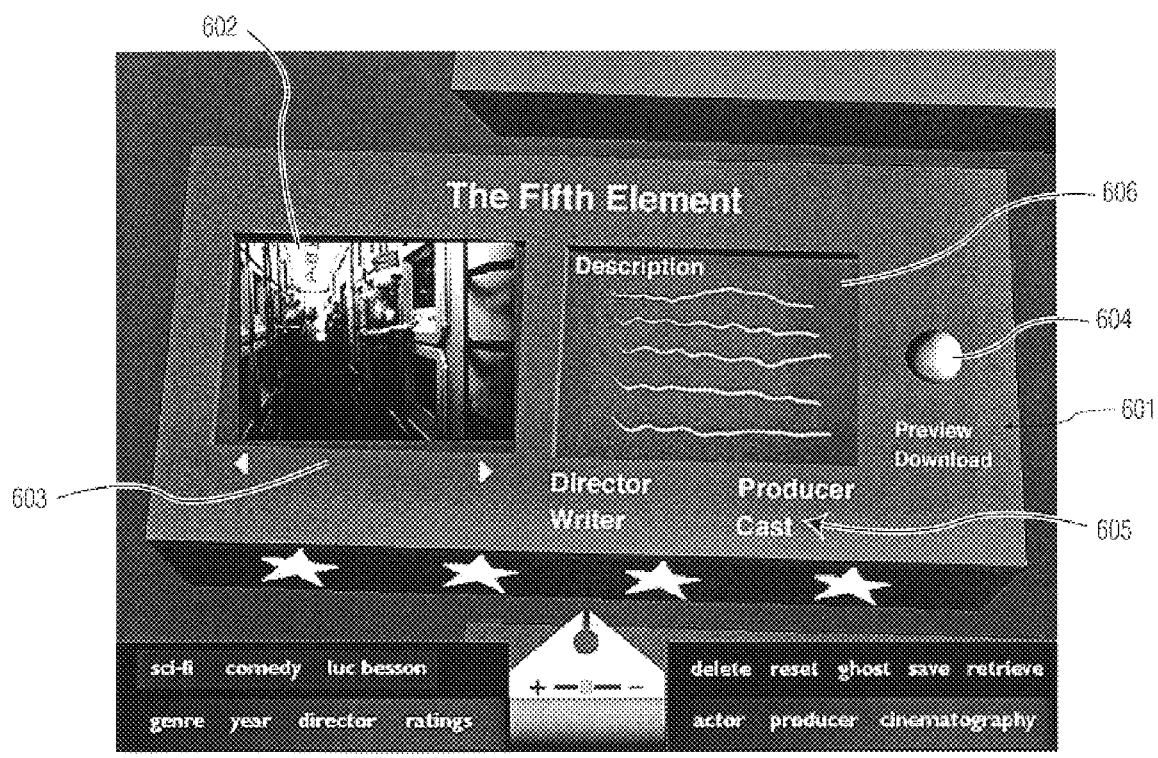
FIG. 6 shows a display of a database item.

In FIG. 6, the user has selected a particular highlighted item from the display of FIG. 5. The selected item is now displayed as an apparent three-dimensional item 601. In this case, the item is shown as an apparent parallelepiped, but other shapes might alternatively be used. The film that has been selected is entitled "The Fifth Element". The display includes a preview area 602 for the film. The preview is acquired by using the preview download button 604. The display includes a scroll area 603 for viewing scenes before and after the illustrated scene. The selected item display also includes query tools at 605 for querying data about the selected film, such as, the director, producer, writer, and cast. A blurb area 606 is also provided for displaying a short text summary of the selected film.

Figure 8:
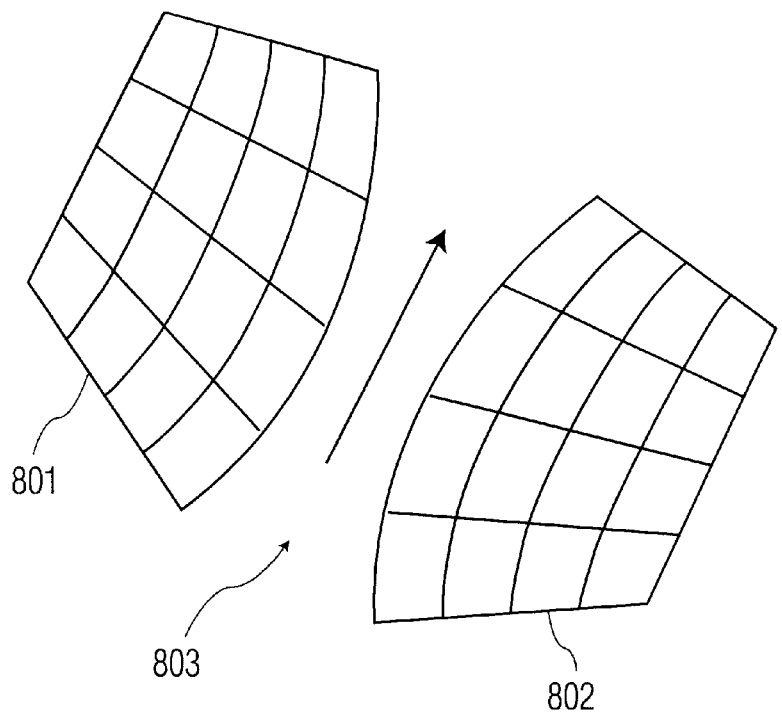
FIG. 8 shows an information river feature.

FIG. 8 shows an embodiment of the interface, particularly adapted for use on the Internet, in which the stadium areas 801 and 802 appear as banks on either side of an information river or aisle 803. This aisle can be a window such as would be created with the search engine "Voyeur". The window might contain other people's searches or advertising for the user to click on.

Figure 9:
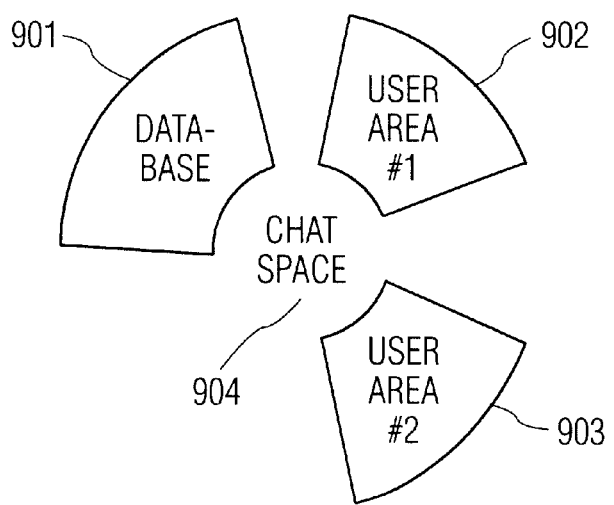
FIG. 9 shows a chat and visit feature.

FIG. 9 shows another embodiment of the interface particularly adapted as a multi-user application for the Internet.

In this embodiment, the database 901 is only part of the information landscape. This landscape also includes, as further sections of the stadium, various user areas 902 and 903 and a chat space 904. In the user areas, 902 and 903, users accumulate their own databases of films, or of pointers to films, that the users consider significant for their own personal reasons. The users can maintain an "open door" policy, allowing all other users to visit their spaces; a "half-open door" policy, allowing authorized visitor to come; or a "closed door" policy, allowing no visitors to their selections.

Users of the embodiment of FIG. 9 can click on the chat space to chat with others interested in the same topic. The chat space can use collaborative filtering, e.g., "FIREFLY" a piece of software developed by Patty Maes of M.I.T., to determine which chat participants should be put in contact with one another, or what user spaces a particular user might want to visit.

Figure 10:
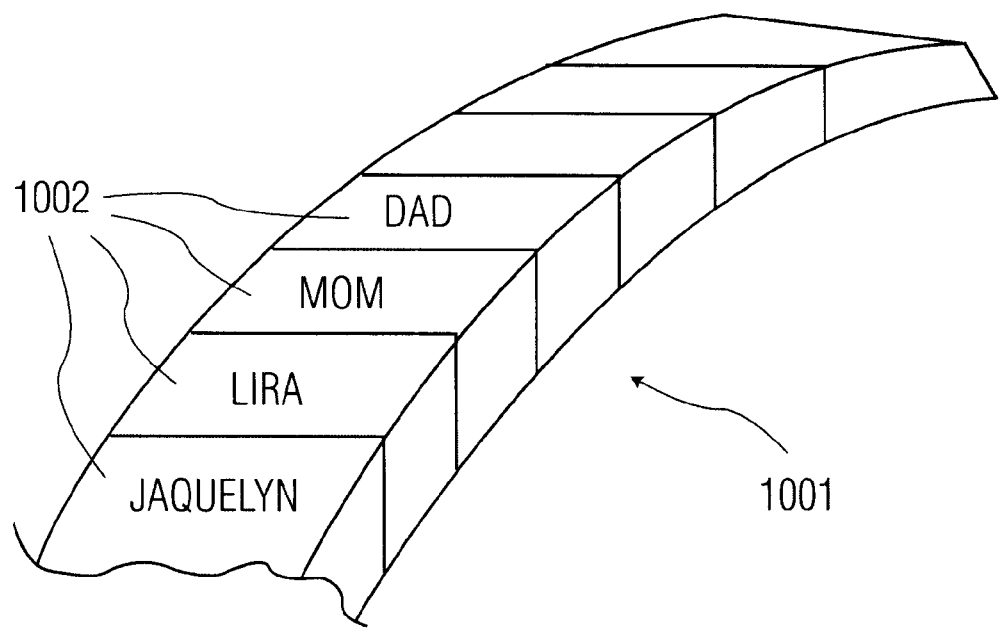
FIG. 10 shows a bridge menu feature.

FIG. 10 shows an optional feature which may be added to the embodiment of FIG. 9. Assuming that user area #2, 903, is the space of the current user, the interface may display a bridge tool 1001 extending over the chat space to user area #1, 902. Each segment 1002 of the bridge space can display a name of a user, e.g., Jacquelyn, Lira, Mom, or Dad, whose area the current user might want to access. Upon selection of an appropriate segment, user area #1, on the screen of the current user, will become the space of the user selected on the bridge tool 1001.

Alternatively or additionally, some of the segments of the bridge tool might specify particular categories of the information landscape 901 which the current user wants to zoom in on.

The preferred embodiment is shown for movies. However, other types of information might equally well be accessed with this interface, for instance, any type of media, such as, audio, software, or other types of audio/visual selections.

From reading the present disclosure, other modifications will be apparent to persons skilled in the art. Such modifications may involve other features which are already known in the design, manufacture and use of graphical user interfaces for database access and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. Applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

We claim:

1. An apparatus for displaying a user interface for browsing a database, said database being embodied in a medium readable by a data processing device, the database including a plurality of data items organizable into categories, the interface comprising an information landscape wherein data items are organized into a plurality of apparent tiers, a first tier being at a respective first apparent level, a second tier being at a respective second apparent level, the second tier being apparently adjacent to the first tier along one apparent dimension, but placed with offsets relative to the first tier in second and third apparent dimensions, the plurality of tiers thus bearing a resemblance to stadium seating, each tier representing a respective information category.

2. The apparatus as claimed in claim 1, wherein each tier represents a time period.

3. The apparatus as claimed in claim 1, wherein:
 a. the tiers are separated by tier boundaries; and
 b. the user interface further comprises a plurality of adjacent sections, superimposed upon the tiers, adjacent sections being separated by section boundaries, the section boundaries crossing the tier boundaries, each section representing a respective second information category.

4. The apparatus as claimed in claim 3, wherein:
 a. each respective data item represents a respective media selection;
 b. each respective section represents a respective type of media selection; and
 c. each respective tier represents a respective time period.

5. The apparatus as claimed in claim 4, wherein said apparatus further comprises a navigation tool, the navigation tool comprising:
 a navigation portion for specifying motion within the information landscape; and
 a critic portion for specifying a higher or lower rating for the media selections to be selected.

6. The apparatus as claimed in claim 1, wherein each pair of adjacent tiers is separated by a tier boundary, each tier boundary being curved, whereby the plurality of tiers together resemble an amphitheater.

7. The apparatus as claimed in claim 6, wherein:
 a. adjacent tiers are separated by tier boundaries;
 b. the interface further comprises a plurality of sections, superimposed upon the tiers, adjacent sections being separated by section boundaries, the section boundaries having an orientation that appears to be perpendicular to the tier boundaries when corrected for perspective, each section corresponding to a respective information category; and
 c. addition of sections increases an apparent radius of curvature of the amphitheater.

8. The apparatus as claimed in claim 1, wherein said apparatus further comprises a query tool for specifying a query.

9. The apparatus as claimed in claim 8, wherein said apparatus further comprises a spotlight feature for shining an apparent spotlight on a portion of the landscape responsive to the query.

10. The apparatus as claimed in claim 8,
 a wherein at least a portion of the information landscape is displayed in a first color; and
 b. wherein said apparatus further comprises a highlighting feature for displaying data items within the portion in a second color that contrasts with the first color, responsive to the query tool.

11. The apparatus as claimed in claim 10, wherein:
 a. the query tool allows specification of at least first, second, and third key words; and
 b. the highlighting feature displays
   i. an intersection of the first and second key words in the second color; and
   ii. an intersection of the first, second, and third key words in a third color that contrasts with both the first and second colors.

12. The apparatus as claimed in claim 1, wherein said apparatus further comprises an apparently horizontal planar area adjacent, but apparently below, at least one apparently lowest of the tiers.

13. The apparatus as claimed in claim 12, wherein the planar area comprises a function selection tool.

14. The apparatus as claimed in claim 13, wherein the function selection tool comprises selectable information.

15. The apparatus as claimed in claim 14, wherein the selectable information flows past the at least one apparently lowest of the tiers.

16. The apparatus as claimed in claim 13, wherein the function selection tool comprises a selectable chat area.

17. The apparatus as claimed in claim 16, wherein said apparatus further comprises a bridge tool for bridging between the first and second portions.

18. The apparatus as claimed in claim 17, wherein the apparent bridge comprises at least one selectable region, each selectable region corresponding to a respective one of those other users.

19. The apparatus as claimed in claim 1, wherein:

a. adjacent tiers are separated by tier boundaries;

b. the tier boundaries are curved so that the information landscape resembles an apparent amphitheater;

c. a first portion of the apparent amphitheater is assigned to a user of the interface for storage of shortcuts to database items chosen by the user; and d. a second portion of the apparent amphitheater represents storage areas where other users store shortcuts to database items chosen by those other users.

20. The apparatus as claimed in claim 19, wherein the bridge tool displays an apparent bridge between the first and second portions.

21. The apparatus as claimed in claim 1, wherein:

a. the data items are individually selectable; and b. in response to selection of an individual data item, the interface displays the data item as an apparent three dimensional object having selectable option positions on a surface of such object.

22. The apparatus as claimed in claim 21, wherein the data items comprise media selections and the selectable option positions comprise a respective preview screen for previewing the individual data item.

* * * * *